US011770330B1

(12) United States Patent
Rohr et al.

(10) Patent No.: US 11,770,330 B1
(45) Date of Patent: *Sep. 26, 2023

(54) AUTOMATICALLY ROUTING NETWORK REQUESTS BETWEEN COMPUTER SUBSYSTEMS

(71) Applicant: Truist Bank, Charlotte, NC (US)

(72) Inventors: Robert Rohr, Charlotte, NC (US); Selcuk Karakaplan, New York, NY (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,993

(22) Filed: Apr. 13, 2022

(51) Int. Cl.
*H04L 45/42* (2022.01)
*H04L 45/302* (2022.01)
*H04L 41/0813* (2022.01)
*H04L 41/22* (2022.01)
*H04L 45/12* (2022.01)
*G06Q 20/22* (2012.01)
*G06Q 20/12* (2012.01)

(52) U.S. Cl.
CPC .......... *H04L 45/42* (2013.01); *H04L 41/0813* (2013.01); *H04L 41/22* (2013.01); *H04L 45/126* (2013.01); *H04L 45/308* (2013.01); *G06Q 20/12* (2013.01); *G06Q 20/227* (2013.01)

(58) Field of Classification Search
CPC ..... H04L 41/0813; H04L 41/22; H04L 45/42; H04L 45/126; H04L 45/308; G06Q 20/12; G06Q 20/227
See application file for complete search history.

(56) References Cited

U.S. PATENT DOCUMENTS

| | | | | |
|---|---|---|---|---|
| 7,653,597 | B1 * | 1/2010 | Stevanovski | G06Q 20/389 705/40 |
| 7,860,789 | B2 * | 12/2010 | Hirka | G06Q 20/28 705/41 |
| 10,262,313 | B2 * | 4/2019 | Lafeer | G06Q 20/405 |
| 11,244,289 | B2 * | 2/2022 | Johnson | G06Q 20/04 |
| 11,550,450 | B1 * | 1/2023 | Rohr | G06F 3/04817 |

(Continued)

FOREIGN PATENT DOCUMENTS

CA 3071178 A1 * 8/2020 ............. G06Q 20/20

OTHER PUBLICATIONS

Notice of Allowance, U.S. Appl. No. 17/718,998, dated Sep. 2, 2022, 9 pages.

Primary Examiner — John M Macilwinen
(74) Attorney, Agent, or Firm — Kilpatrick Townsend & Stockton LLP; Michael A. Springs, Esq.

(57) ABSTRACT

Network requests can be automatically routed between two or more computer subsystems in some examples. In one such example, a system can determine that a user is eligible for a service based on usage data relating to an account of the user. Based on determining that the account is eligible for the service, the system can activate the service for the user by communicating with a service subsystem. Subsequent to activating the service for the user, the system can receive a network request associated with the user and determine that the network request has a characteristic. Based on determining that the network request has the characteristic, the system can forward the request to the service subsystem. The service subsystem can complete the network request using the service.

20 Claims, 5 Drawing Sheets

(56) References Cited

U.S. PATENT DOCUMENTS

| | | |
|---|---|---|
| 2007/0067446 A1 | 3/2007 | Jones et al. |
| 2012/0259776 A1* | 10/2012 | Bajaj .................. G06Q 40/02 |
| | | 705/42 |
| 2014/0006277 A1 | 1/2014 | Rao |
| 2014/0172693 A1* | 6/2014 | Kanjlia ............... G07F 19/206 |
| | | 705/39 |
| 2017/0278092 A1 | 9/2017 | Simanek et al. |
| 2019/0251542 A1* | 8/2019 | Sjoberg ............... G06Q 20/407 |
| 2021/0158348 A1 | 5/2021 | Wardman et al. |
| 2021/0241256 A1* | 8/2021 | Caldwell ........... G06Q 20/0855 |

\* cited by examiner

AUTOMATICALLY ROUTING NETWORK REQUESTS BETWEEN COMPUTER SUBSYSTEMS

TECHNICAL FIELD

The present disclosure relates generally to handling network requests. More specifically, but not by way of limitation, this disclosure relates to automatically routing network requests between two or more computer subsystems.

BACKGROUND

A service provider can have a computing system formed from a physical infrastructure containing a hardware router and other network hardware. The network hardware can be configured for routing network requests through a network. The network requests can include any requests transmitted from one or more sources via one or more networks, such as a local area network or the Internet. The network hardware can have fixed rules for directing network traffic through the computing system. The rules may be stored in a routing table within the network hardware. The routing table can dictate that network traffic be routed in a certain manner, for example based on packet headers or payloads. An administrator of the computing system may be able to manually configure the rules.

End users may have accounts with the service provider. The end users may interact the computing system to monitor or perform functions using their accounts. For example, an end user may execute a mobile application to access a mobile interface through which the end user can monitor his account and perform functions using his account. The mobile application can interact with one or more backend servers of the computing system, where the backend servers are configured to support the mobile application. Alternatively, the computing system can include one or more web servers that are configured provide a web interface through which the end user can monitor his account and perform functions using his account via a web browser. While such interfaces can allow the user to perform certain limited account functions, these interfaces generally lack any capability for the end user to control how network requests are directed through the computing system.

SUMMARY

One example of the present disclosure includes a system comprising one or more processors. The system can also comprise a memory including program code that is executable by the one or more processors for causing the one or more processors to perform operations. The operations can include determining that a user is eligible for a service based on usage data relating to an account of the user. The service can be provided separately from the account. The operations can include, based on determining that the account is eligible for the service, activating the service for the user by communicating with a service subsystem. The operations can include, subsequent to activating the service for the user: receiving a network request associated with the user; determining that the network request has a characteristic; and based on determining that the network request has the characteristic, forwarding the request to the service subsystem. The service subsystem can be configured complete the network request using the service rather than the account.

Another example of the present disclosure includes a method. The method can include determining that a user is eligible for a service based on usage data relating to an account of the user. The service can be provided separately from the account. The method can include, based on determining that the account is eligible for the service, activating the service for the user by communicating with a service subsystem. The method can include, subsequent to activating the service for the user: receiving a network request associated with the user; determining that the network request has a characteristic; and based on determining that the network request has the characteristic, forwarding the request to the service subsystem. The service subsystem can be configured complete the network request using the service rather than the account. The method may be implemented by one or more processors of a computer system.

Yet another example of the present disclosure includes a non-transitory computer-readable medium comprising program code that is executable by one or more processors for causing the one or more processors to perform operations. The operations can include determining that a user is eligible for a service based on usage data relating to an account of the user. The service can be provided separately from the account. The operations can include, based on determining that the account is eligible for the service, activating the service for the user by communicating with a service subsystem. The operations can include, subsequent to activating the service for the user: receiving a network request associated with the user; determining that the network request has a characteristic; and based on determining that the network request has the characteristic, forwarding the request to the service subsystem. The service subsystem can be configured complete the network request using the service rather than the account.

DETAILED DESCRIPTION

Figure 1:
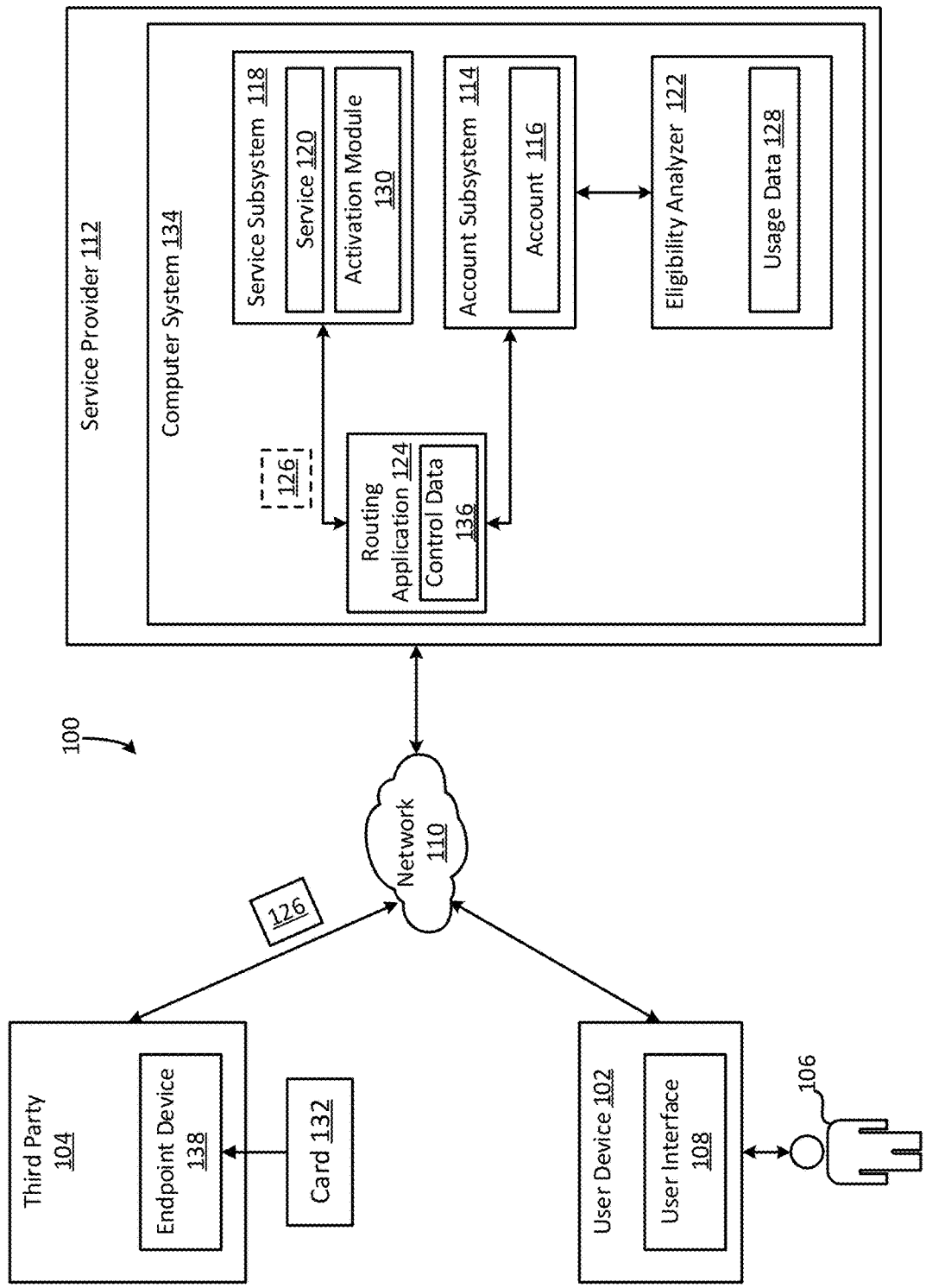
FIG. 1 is a block diagram of an example of a system for implementing some aspects of the present disclosure.

Certain aspects and features of the present disclosure relate to a routing application that can selectively route network requests to various computer subsystems of a service provider based on selections input by an end user of the service provider. The computer subsystems can include a first subsystem that is configured to complete (e.g., fulfill) network requests using an account of the end user, where the account can be hosted by the service provider. The computer subsystems can also include a second subsystem that is configured to complete network requests using a service that is provided by the service provider separately from the account. Through a graphical user interface, the end user can select which types of network requests are to be completed using their account and which types of network requests are to be completed using the provided service. Network requests can then be automatically routed to one computer subsystem or the other computer subsystem based on the user's selections.

In some examples, the routing application and the computer subsystems may be operated by a service provider that is hosting the user's account, where the service provider is different from the end user. The service provider may generate and transmit the graphical user interface to a user device of the end user, so that the end user can input (e.g., select) which network requests are to be handled using their account and which network requests are to be handled using the provided service. Based on the user's inputs, the service provider can configure the routing application to automatically forward network requests to the appropriate computer subsystem. It will be appreciated that the network requests may be transmitted from any suitable source. For example, the network requests may be transmitted by a user device of the user, the service provider, or a third party that is different from the service provider and the user.

In some examples, the service provider can determine whether the end user is eligible for the service prior to activating the service for the end user. The service provider may determine whether the end user is eligible for the service by analyzing usage data relating to the user's account. The usage data may include inflows and outflows relating to the user's account during a selected time period. The analysis may be performed using a model, such as a machine-learning model. Examples of a machine-learning model can include a neural network, a Naive Bayes classifier, or a support vector machine. The model can analyze the usage data (e.g., account history) and generate an output indicating whether the end user is eligible for the service. If the end user is eligible for the service and the service is not currently activated for the user, the service provider may activate the service for the user. If the end user is eligible for the service and the service is already activated for the user, the service provider may maintain the service as active for the user. If the end user is not eligible for the service and the service is currently activated for the user, the service provider may deactivate the service for the user. If the end user is not eligible for the service and the service not currently activated for the user, the service provider may maintain the service as deactivated for the user. Over time, the service provider may periodically reassess whether the end user is eligible for the service and activate or deactivate the service accordingly.

In some examples, the service provider can transmit a notification to the end user indicating their eligibility for the service, prior to the service being activated. The end user may then respond to the notification by approving or disapproving the service. The service may only be activated if the end user approves the service. In some examples, the end user may need to apply a digital signature to a digital document to approve the service.

In some examples, a network request may be initiated by the end user using a card (e.g., a digital card or a physical card) to obtain access to a resource. For example, the end user may slide the card through a card reader or otherwise use the card to interact with an endpoint device positioned at a physical location to access to a resource. Based on the card interaction, the endpoint device can generate and transmit a network request to the service provider for processing. The routing application of the service provider may receive the network request, determine one or more characteristics of the network request, and route the network request to one of the computer subsystems based on the one or more characteristics of the network request and the selections made by the end user.

Some examples of the present disclosure can provide end users with a higher degree of flexibility and control over the routing of network requests than is possible with conventional computer systems. For example, a conventional computing system may have a physical infrastructure that includes a hardware router and other network components. The hardware router can have fixed rules for directing network traffic through the computing system. An administrator of the computing system may be able to manually set and adjust the rules. The rules may be stored as a routing table in the hardware router and dictate that the hardware router direct traffic through the network in a certain manner based on packet headers or payloads. In a typical scenario, an end user may have an account with the computing system that grants the user with user-level access to the computing system. But, that user-level access generally does not give the end user sufficient permissions to modify the routing table stored in the hardware router or otherwise control how network requests are directed through the network. As a result, the end user may not have the capability to selectively redirect certain types of network requests to different subsystems of the computing system, so that the network requests are handled using a target account or service that is distinct from the end user's account. These limitations can prevent the end user from optimizing their usage of their account and the service provider.

Some examples of the present disclosure can overcome one or more of the abovementioned problems by allowing an end user, that has an account hosted by a service provider, to select how requests (e.g., network requests) are to be handled by the service provider. For example, the end user can select that some types of requests are to be handled using the user's account and other types of requests are to be handled using a service offered by the service provider, where the service is distinct from the user's account. This can provide a greater level of control, and a more granular level of control, to the end user than may otherwise be possible. And as mentioned above, the routing feature may be closely monitored and controlled to prevent abuse of the system. For example, the end user may be prevented from using the routing feature until the computer system determines that the end user is eligible to do so, for example based on an analysis of the user's account history. This can be dynamic such that the end user's account history is periodically reassessed and the routing feature is enabled or disabled accordingly, to improve the security of the system.

These illustrative examples are given to provide the reader with the general subject matter discussed here and are not intended to limit the scope of the disclosed concepts. The following sections describe various additional features and examples with reference to the drawings in which like numerals indicate like elements.

FIG. 1 is a block diagram of an example of a system 100 for implementing some aspects of the present disclosure. The system 100 includes a service provider 112 that can operate a computer system 134. In some examples, the computer system 134 may be a distributed computer system, such as a cloud computing system or a computing cluster, formed from one or more nodes (e.g., physical or virtual servers) that are in communication with one another via a network. The computer system 134 can be formed from a physical infrastructure that includes various network hardware, such as routers, hubs, bridges, switches, and firewalls. The physical infrastructure can also include one or more servers through which a user 106 can perform account functions related to an account 116. The servers may provide backend support for a mobile application or may provide a web interface for enabling the user 106 to perform the account functions. In some examples, the servers may be part of, or otherwise interface with, an account subsystem 114 configured to effectuate the account functions.

A user may establish an account 116 with the service provider 112 for use in performing various functions. The account 116 may be of any suitable type. For example, the service provider 112 may be a bank and the account 116 may be a deposit account. The process of establishing the account 116 may require the user to fill out forms for security purposes. After establishing the account 116 with the service provider 112, the user 106 may use the account to perform various functions. For example, the user 106 may use the account 116 to obtain access to various resources, such as physical objects or virtual objects. Examples of the physical objects can include food, clothing, and electronics. Examples of the virtual objects can include software, videos, and music files.

In some examples, the user 106 may use the account 116 to obtain access to resources of a third party 104, which may be different from the user 106 and the service provider 112. For example, the user 106 may use a card 132 to interact with an endpoint device 138 of a third party 104 for accessing a resource provided by the third party 104. An example of the endpoint device 138 can be a card reader or hub. The card 132 may be linked to the account 116 and may be provided by the service provider 112. Examples of the card 132 can include a digital card or a physical card, such as a debit card or a key card for controlling access to a physical location. The card 132 may be a smart card with contactless technology. The third party 104 can respond to such user interactions by transmitting one or more requests 126 (e.g., network requests) to the computer system 134. For example, the endpoint device 138 can transmit the requests 126 via a network 110, such as the Internet, to the computer system 134. In turn, the computer system 134 can respond to the requests 126 by performing one or more account functions related to the account 116, such as reducing a balance in the account 116.

The user 106 may also provide resources to the account 116 over time. For example, the user 106 may deposit funds into the account at periodic intervals. Alternatively, an entity that is distinct from but associated with the user 106 may provide resources to the account. One example of such an entity may be an employer of the user 106. Usage of the account 116 may result in inflows to and outflows from the account 116.

Separately from establishing the account 116, the user 106 may register for an online account with the service provider 112 for use in monitoring and performing functions related to the underlying account 116. For example, the user 106 may go through a signup process to register an online account with the computer system 134. The user 106 may then link the online account to the underlying account 116 hosted by the service provider 112. In some such examples, the online account can be distinct from the underlying account 116 and may be used to access the computer system 134 to perform account functions related to the underlying account 116.

The user 106 can register the online account and otherwise interact with the computer system 134 via a user device 102. Examples of the user device 102 can include a mobile phone, a laptop computer, a desktop computer, or a smart watch. The user device 102 can interact with the computer system 134 via the network 110.

The service provider 112 can provide a user interface 108 (e.g., a graphical user interface) to the user 106 for controlling the account 116. The user 106 can access the user interface 108 by logging in to the online account. This may involve the user 106 authenticating with the computer system 134. For example, the user 106 can provide a username and password associated with the online account to the computer system 134. Upon authenticating the username and password, the computer system 134 may allow the user 106 to access the user interface 108. In some cases, the user interface 108 may be part of an application (e.g., a native application) executing on the user device 102. In other cases, the user interface 108 may be part of a website accessible via a website browser. The user interface 108 may allow the user to perform account functions related to the underlying account 116 hosted by the service provider 112.

In some examples, the computer system 134 includes an eligibility analyzer 122. The eligibility analyzer 122 can retrieve usage data 129 related to the account 116 from the account subsystem 114. An example of the usage data 128 can an account history describing prior usage of the account 116. The eligibility analyzer 122 can analyze any amount of the usage data 128 to determine whether the user 106 is eligible for a service 120 offered by the service provider 112. The service 120 can be distinct from the account 116 and offered separately from the account 116. The eligibility analyzer 122 can determine whether the user 106 is eligible for a service 120 based on any suitable criteria, such as a balance in the account 116 or a pattern of usage of the account 116.

In some examples, the eligibility analyzer 122 can include one or more models configured to receive the usage data 128 as input and generate an output indicating the eligibility of the user 106 for the service 120. The models may include a machine-learning model or another type of model. Examples of the machine-learning model may include neural network or classifier. The machine-learning model may go through a training process to tune weights therein prior to being deployed for use. The training process may include supervised training or unsupervised training, depending on the type of model used and the training data that is available. In some cases, the training data used in the training process may include usage histories that are pre-labeled as eligible or ineligible for the service 120.

Depending on the results from the eligibility analyzer 122, the user 106 may be deemed eligible for the service 120. If the user 106 is deemed eligible for the service 120, the computer system 134 can transmit a notification to the user (e.g., via the user interface 108, an email, an SMS message, etc.) indicating that the user 106 is eligible for the service 120. The notification may request that user 106 approve or deny the service 120. If the user approves the service 120, the computer system 134 may activate the service 120 for the user 106 and transmit another notification to the user 106 indicating that the service 120 is now available. Activating the service 120 may involve transmitting a communication to a service subsystem 118 that is configured to manage the service 120 for users. In response to receiving the communication, the service subsystem 118 may perform one or more operations to activate the service 120 for the user 106. For example, the service subsystem 118 can add an entry to a table indicating that the service 120 is active for the user 106.

With the service 120 now active, the user 106 may want to initiate and configure use of the service 120. To that end, the computer system 134 may update the user interface 108 to include graphical features through which the user 106 can select how to distribute requests between the service 120 and the account 116. For example, the user 106 may interact with the user interface 108 to select that some types of requests should be handled using the service 120 and other types of requests should be handled using the account 116. As one such example, the user 106 may select that requests from one entity (e.g., third party 104) should be handled using the service 120 and requests from another entity (e.g., user device 102) should be handled using the account 116. Through the user interface 108, the user 106 can selectively assign requests with any characteristic or characteristics to either the service 120 or the account 116 as desired. In this way, the user 106 can choose how requests are handled by the computer system 134.

Once the user 106 has input the selections via the user interface 108, the computer system 134 may receive the selections and generate corresponding control data 136. The computer system 134 can then supply the control data 136 to a routing application 124. The control data 136 can configure the routing application 124 to implement the user's selections. For example, the control data 136 can include a mapping that correlates certain request characteristics to certain destinations, such as the account subsystem 114 or the service subsystem 118.

With the routing application 124 configured, the routing application 124 may forward subsequent requests to the appropriate destination. For example, the computer system 134 may receive a request 126 from a third party 104. The request 126 may relate to an online payment, usage of the card 132, or another type of transaction. The computer system 134 can forward the request 126 to the routing application 124, which can analyze the request 126 to determine one or more characteristics thereof. Examples of such request characteristics can include (i) a third party that is associated with the request 126, (ii) a geographical location that is associated with the request 126, (iii) an amount that is associated with the request 126, (iv) a type of resource associated with the request 126, or (v) any combination of these. Upon receiving the request 126, the routing application 124 can access the control data 136 to determine the appropriate destination for requests having the determined characteristics. For example, the routing application 124 can access the control data 136 to determine that the request 126 is to be routed to the service subsystem 118 based on the request 126 being for a first type of resource. The service subsystem 118 can be configured to complete (e.g., handle) the request 126 using the service 120. Alternatively, the routing application 124 can access the control data 136 to determine that the request 126 is to be routed to the account subsystem 114 based on the request 126 being for a second type of resource that is different from the first type of resource. The account subsystem 114 can be configured to handle the request 126 using the account 116. In this way, the routing application 124 can automatically direct requests to either the service subsystem 118 or the account subsystem 114 depending on the characteristics of the requests and the user's selections.

As the user 106 continues to use the account 116 over time (e.g., to engage in online transactions using the account 116), the usage data 128 may be updated accordingly. So, the eligibility analyzer 122 may periodically reassess (e.g., monthly) the eligibility of the user 106 for the service 120. If the eligibility analyzer 122 subsequently determines that the user 106 is no longer eligible for the service 120, the eligibility analyzer 122 may transmit a communication to the service subsystem 118 to deactivate the service 120 for the user 106. In response to receiving the communication, the service subsystem 118 may perform one or more operations to deactivate the service 120 for the user 106. For example, the service subsystem 118 can remove an entry from a table of users for which the service 120 is active.

Additionally or alternatively, the eligibility analyzer 122 can generate corresponding control data 136 and supply the control data 136 to the routing application 124. The control data 136 can configure the routing application 124 to route future requests associated with the user 106 to a default destination, such as the account subsystem 114. This may be the default when the service 120 is not active for the user 106. The control data 136 can override a previously stored mapping so that future requests are routed to the default destination, independently of the user's selections.

Once the service 120 is deactivated for the user 106, the user may 106 remain ineligible for the service 120 until the next time window begins. At that point, the above process can repeat with the eligibility analyzer 122 determining whether the user 106 is eligible to use the service 120 during that time window. In this way, access to the service 120 may be limited in duration to a particular time window and the computer system 134 can automatically control access to the service 120 during that time window.

As noted above, the computer system 134 may automatically and periodically assess whether the user 106 is eligible for the service 120. In some examples, the user 106 may also be able to request access to the service 120. For example, the user 106 may select a button in the user interface 108 for requesting access to the service 120. In response to the selection, the user device 102 may transmit a request to the computer system 134 to access the service 120. Based on receiving the request, the computer system 134 can execute the eligibility analyzer 122 to determine whether the user 106 is eligible to use the service 120. If the eligibility analyzer 122 determines that the user 106 is eligible, the computer system 134 may activate the service 120 for the user 106. Otherwise, the computer system 134 may transmit a response to the request indicating that the user 106 is currently ineligible for the service 120. In this way, the user 106 may be able to request the service 120 as desired.

It will be appreciated that the example shown in FIG. 1 is intended to be illustrative and non-limiting. Other examples may include more components, fewer components, different components, or a different combination of the components than are shown in FIG. 1. For instance, in another example the eligibility analyzer 122 and the routing application 124 may be combined into a single software module that is capable of implementing both of their functionalities. And although FIG. 1 involves distributing requests between two different subsystems (the service subsystem 118 and the account subsystem 114), other examples may involve a larger number of subsystems and more-complex routing schemes through which the user 106 can select among a larger number of options for handling requests.

Figure 2:
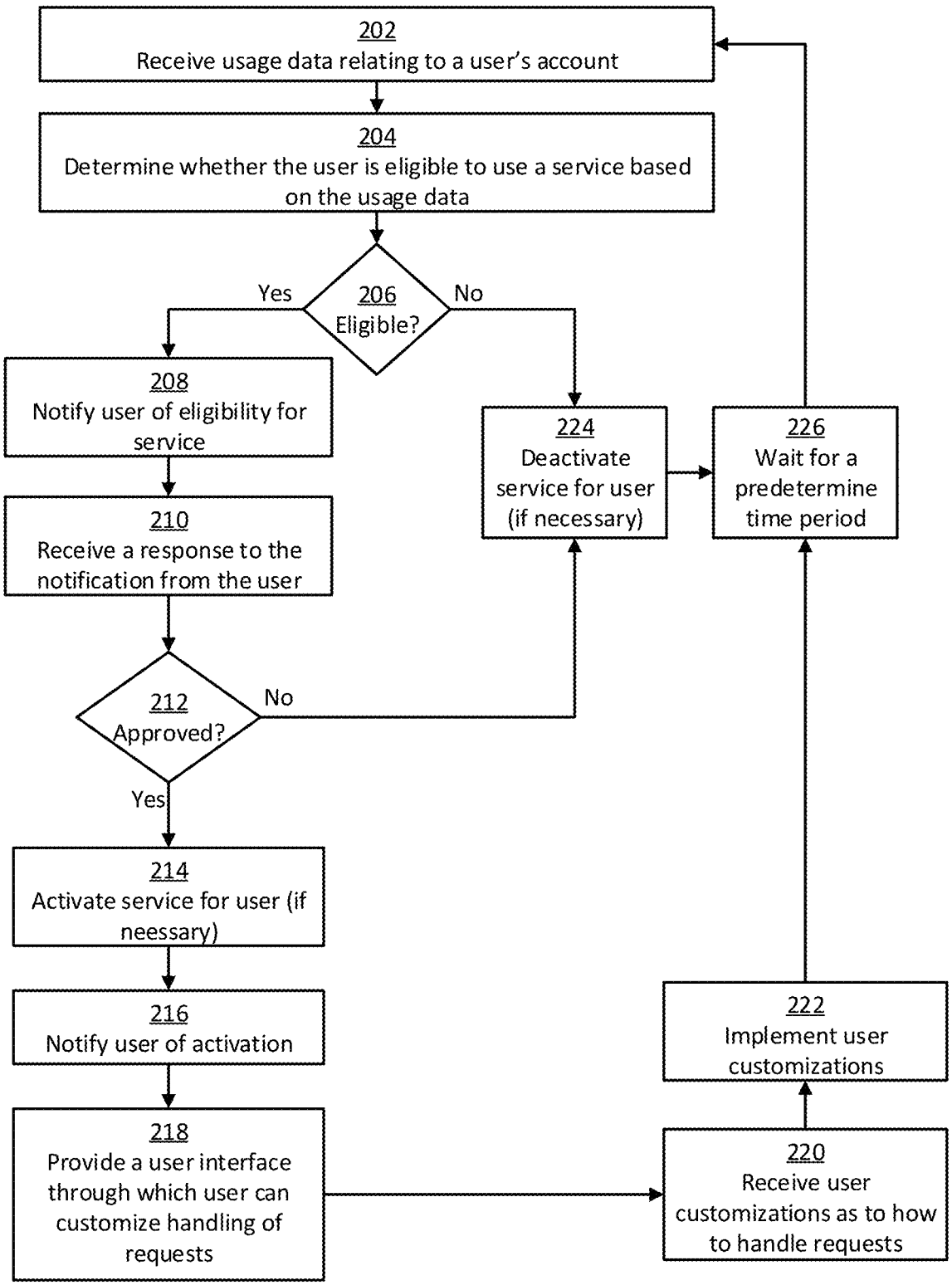
FIG. 2 is a flow chart of an example of a process for implementing some aspects of the present disclosure.

FIG. 2 is a flow chart of an example of a process for implementing some aspects of the present disclosure. Other examples may involve more operations, fewer operations, different operations, or a different order of the operations than are shown in FIG. 2. The operations below will now be described with reference to the components of FIG. 1 above.

In block 202, an eligibility analyzer 122 receives usage data 128 relating to an account 116 of a user 106. The eligibility analyzer 122 may receive the usage data 128 from an account subsystem 114 or another subsystem of a computer system 134 operated by a service provider 112. The eligibility analyzer 122 can also be part of the computer system 134 and may be configured to determine the eligibility of the user 106 for a service 120. An example of the service 120 may be a credit service for providing the user 106 with a credit line.

In block 204, the eligibility analyzer 122 determines whether the user 106 is eligible for the service 120 based on the usage data 128. This may involve comparing a pattern of usage expressed in the usage data 128 to one or more predefined criteria. In some examples, the eligibility analyzer 122 may employ a model, such as a machine-learning model, to determine whether the user 106 is eligible for the service 120. As shown in block 206, the process can branch to block 208 if the user 106 is determined to be eligible for the service 120 or branch to block 224 if the user 106 is determined to be ineligible for the service 120.

In block 208, the computer system 134 notifies the user 106 that the user 106 is eligible for the service 120. For example, the computer system 134 can transmit a message to the user 106 indicating that the user 106 is eligible for the service 120. Additionally or alternatively, the computer system 134 can update a user interface 108 (e.g., of a mobile application or a web interface) to indicate that the user 106 is eligible for the service 120.

In block 210, the computer system 134 receives a response to the notification from the user 106. The response can indicate the user's approval or denial of the service 120. For example, the user 106 can operate a user device 102 to select an "approve" button or a "deny" button within the user interface 108. The user device 102 can detect this selection and transmit a corresponding communication to the computer system 134 indicating the user's selection. The communication can act as a response to the notification provided to the user 106 in block 208.

In block 212, the computer system 134 determines whether the service 120 was approved or rejected by the user 106. The computer system 134 based on the response received in block 210. If the computer system 134 determines that the service 120 was approved, the process can branch to block 214. Otherwise, the process can branch to block 224, where the computer system 134 can deactivate the service 120 for the user 106 (if necessary). If the service 120 was already previously deactivated for the user 106, then the computer system 134 may not need to deactivate the service 120 again. If the service 120 was not already previously deactivated for the user 106, then the computer system 134 can deactivate the service 120. Deactivating the service 120 may involve communicating with a service subsystem 118 to add an entry to a table or remove an entry from a table. Deactivating the service 120 may additionally or alternatively involve generating and transmitting control data to a routing application 124, for example so that subsequent requests related to the user 106 are automatically routed to an account subsystem 114.

In block 214, the computer system 134 activates the service 120 for the user 106 (if necessary). If the service 120 was already previously activated for the user 106, then the computer system 134 may not need to activate the service 120 again. If the service 120 was not already previously activated for the user 106, then the computer system 134 can activate the service 120. Activating the service 120 may involve communicating with a service subsystem 118 to add an entry to a table or remove an entry from a table. In some examples, the entry may include a unique identifier of the user or an account number related to the account 116.

In block 216, the computer system 134 notifies the user 106 that the service 120 is active. For example, the computer system 134 can transmit a message to the user 106 indicating that the service 120 is now active. Additionally or alternatively, the computer system 134 can update a user interface 108 to indicate that the service 120 is now active for the user 106.

Figure 3A:
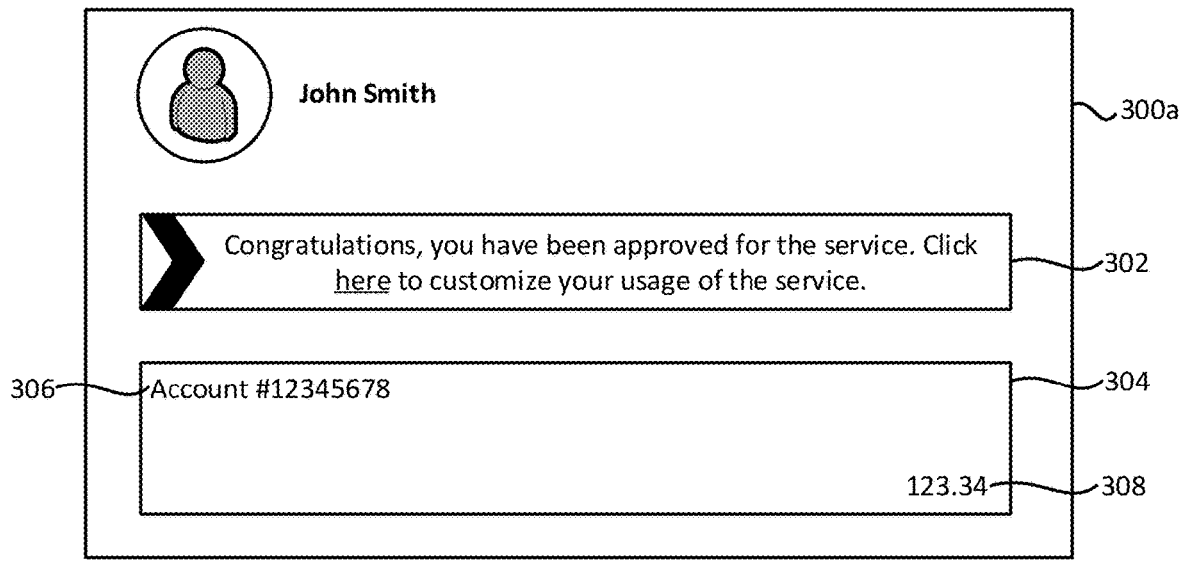
FIGS. 3A-B depict examples of graphical user interfaces for implementing some aspects of the present disclosure.
Figure 3B:
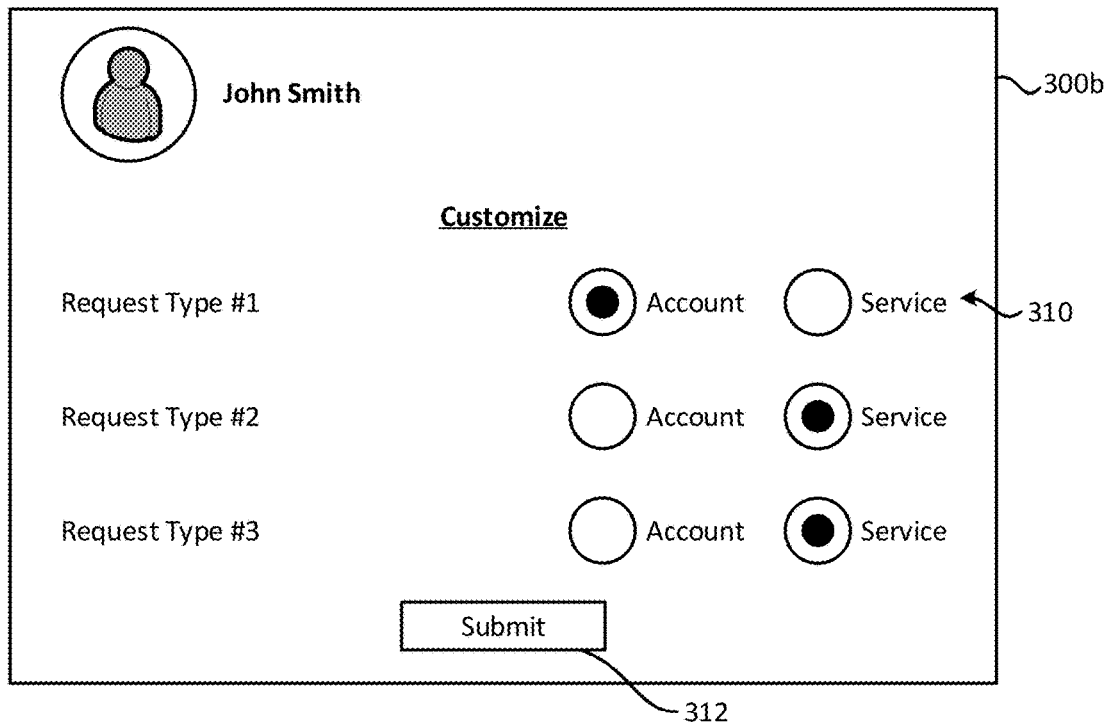

In block 218, the system 100 can provide the user 106 with a user interface 108 through which the user 106 can choose how requests are handled by the computer system 134. One example of the user interface 108 is shown in FIGS. 3A-3B. As shown in FIG. 3A, the user interface 108 may include an interface page 300a that may be displayed on the user device 102. The interface page 300a can include a notification 302 indicating that the service 120 is now active for the user 106. The interface page 300a may additionally or alternatively include account data 304 related to the user's account 116. The account data 304 can describe one or more characteristics of the account 116. Examples of the account data 304 can include an account name, number 306, balance 308, or other characteristic. In some examples, the user 106 can select a graphical element, such as the notification 302, within the interface page 300a to transition to another interface page 300b, through which the user 106 may be able to select how requests are to be handled.

An example of the other interface page 300b is shown in FIG. 3B. As shown, the interface page 300b can include selection options 310, which can include any suitable type of graphical elements such as radio buttons, check boxes, pull down menus, icons, text boxes, etc. The user 106 may interact with the selection options 310 to select how different types of requests (e.g., requests with different characteristics) are to be handled by the service provider 112. In the example shown in FIG. 3B, the user 106 selected that a first type of request be completed using the account 116, a second type of request be completed using the service 120, and a third type of request be completed using the service 120. But other examples may involve more types of requests and more selection options, depending on the available routing capabilities. Once the user 106 has input the selections, the user 106 can interact with a submit button 312 to finalize the process. In response to detecting such an interaction, the user device 102 can transmit the user's selections to the computer system 134.

Continuing with FIG. 2, in block 220 the computer system 134 receives the user's customizations as to how to handle requests. For example, the computer system 134 can receive the selections input by the user 106 to the interface page 300b described above. The computer system 134 may receive the user customizations in one or more communications transmitted by the user device 102 via a network 110.

In block 222, the computer system 134 implements the user's customizations. This may involve generating and transmitting control data to the routing application 124 to configure the routing application 124 in accordance with the user's customizations. As a result, subsequent requests related to the user 106 may be distributed between the account subsystem 114 and the service subsystem 118 in a manner that complies with the user's selections.

In some examples, the process can repeat over time. For example, the process can include block 226 during which the computer system 134 can wait for a predetermined time period. Upon the expiration of the predetermined time period, the process can return to block 202 and restart with the receipt of updated usage data relating to the user's account 116.

Figure 4:
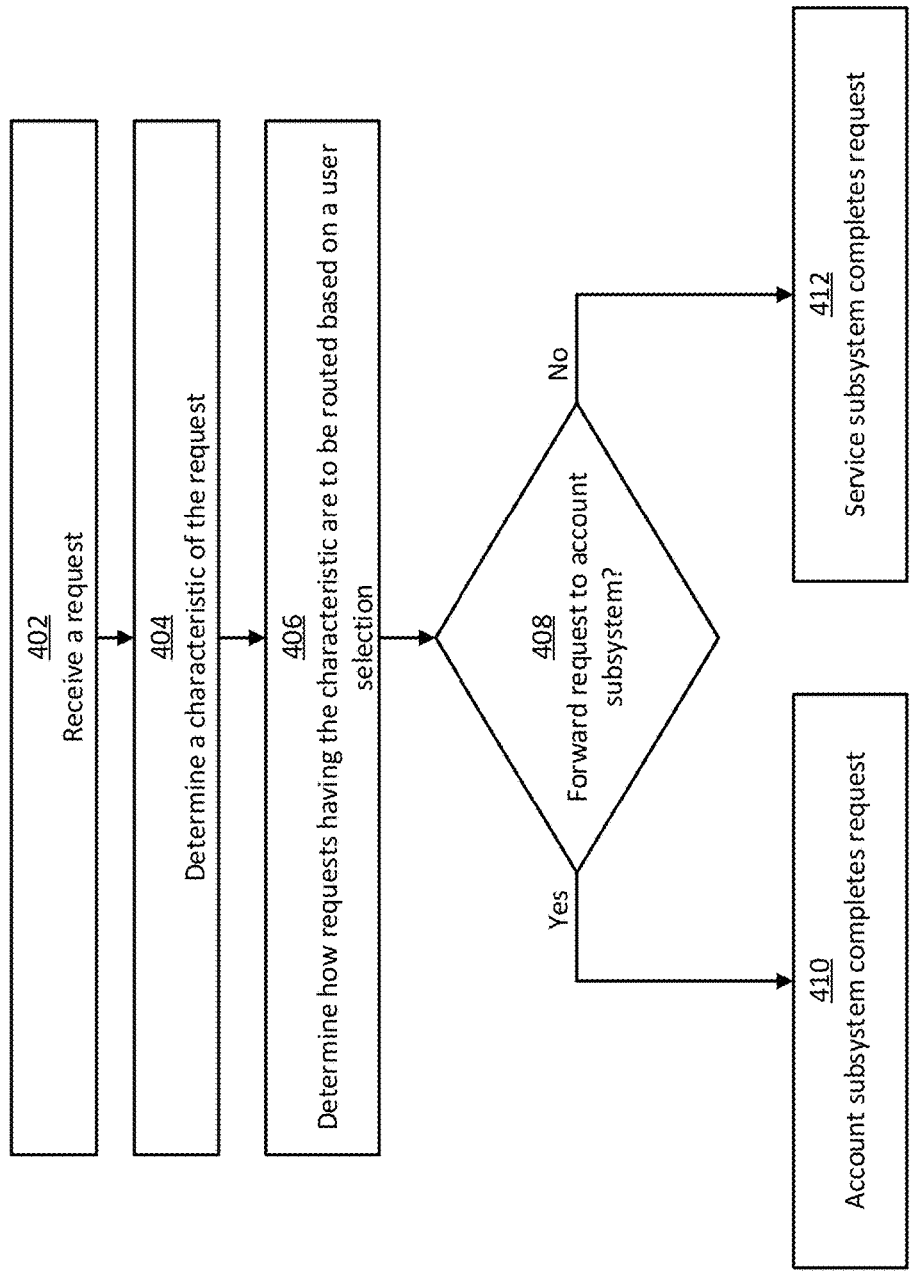
FIG. 4 is a flow chart of an example of a routing process for implementing some aspects of the present disclosure.

FIG. 4 is a flow chart of an example of a process for implementing some aspects of the present disclosure. Other examples may involve more operations, fewer operations, different operations, or a different order of the operations than are shown in FIG. 4. The operations below will now be described with reference to the components of FIG. 1 above.

In block 402, a computer system 134 receives a request 126, such as a network request. The computer system 134 can receive the request 126 via the network 110. In some examples, the request 126 may correspond to an activity performed by a user 106 in relation to a third party 104.

In block 404, the computer system 134 determines a characteristic of the request 126. This may involve analyzing the headers or payloads of one or more data packets associated with the request 126. For example, the computer system 134 may extract the payload data from one or more data packets associated with the request 126 and analyze the payload data to determine the characteristic.

In block 406, the computer system 134 determines how requests having the characteristic are to be routed based on a user selection. For example, the computer system 134 may include a routing application 124 storing control data 136 that was previously generated or updated based on the user selection. The control data 136 can specify how requests having the characteristic are to be routed. The routing application 124 can access the control data 136 to determine how requests having the characteristic are to be routed.

In block 408, the computer system 134 (e.g., the routing application 124) determines whether the request 126 is to be forwarded to an account subsystem 114 based on the determination made in block 406. In some examples, the computer system 134 may be configured to forward the request 126 to the account subsystem 114 by default.

If the computer system 134 determines that the request 126 is to be forwarded to the account subsystem 114, the process can proceed to block 410 where the computer system 134 can transmit the request 126 to the account subsystem 114. Otherwise, the process can proceed to block 412 where the computer system 134 can transmit the request 126 to a service subsystem 118.

Figure 5:
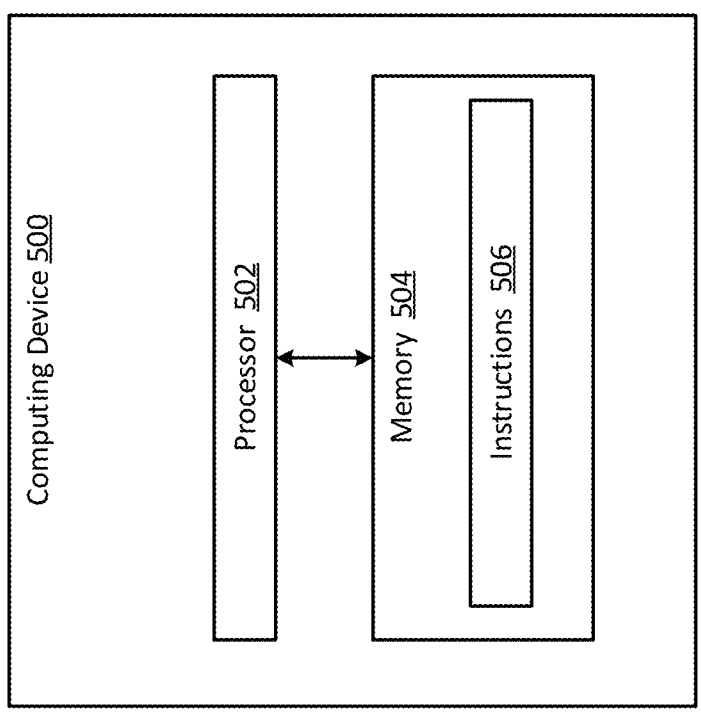
FIG. 5 is a block diagram of an example of a computing device for implementing some aspects of the present disclosure.

FIG. 5 is a block diagram of an example of a computing device 500 for implementing some aspects of the present disclosure. The computing device 500 may correspond to the user device 102 or may be part of the computer system 134 described above.

The computing device 500 includes a processing device 502 coupled to a memory device 504 via a bus. The processing device 502 can include one processing device or multiple processing devices. Non-limiting examples of the processing device 502 include a Field-Programmable Gate Array (FPGA), an application-specific integrated circuit (ASIC), a microprocessor, etc. The processing device 502 can execute instructions 506 stored in the memory device 504 to perform operations. Examples of such operations can include any of the operations described above with respect to the user device 102 or the computer system 134. In some examples, the instructions 506 can include processor-specific instructions generated by a compiler or an interpreter from code written in any suitable computer-programming language, such as C, C++, C#, etc.

The memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. In some examples, at least some of the memory device can include a medium from which the processing device 502 can read instructions 506. A computer-readable medium can include electronic, optical, magnetic, or other storage devices capable of providing the processing device 502 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 506.

The computing device 500 may also include other input and output (I/O) components, which are not shown here for simplicity. Examples of such input components can include a mouse, a keyboard, a trackball, a touch pad, and a touch-screen display. Examples of such output components can include a visual display, an audio display, and a haptic display. Examples of a visual display can include a liquid crystal display (LCD), a light-emitting diode (LED) display, and a touch-screen display. An example of an audio display can include speakers. An example of a haptic display may include a piezoelectric vibration device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system of a service provider, the system comprising:
one or more processors; and
a memory including program code that is executable by the one or more processors for causing the one or more processors to:
establish an online account for a user;
link the online account to a deposit account of the user with the service provider, the online account being usable to perform account functions related to the deposit account, wherein the account functions include viewing a balance of the deposit account;
determine that the user is eligible for a financial service based on usage data relating to the deposit account of the user, the financial service being provided separately by the service provider from the deposit account;
based on determining that the deposit account is eligible for the financial service:
provide a notification to the user, through a graphical user interface when the user is logged into the online account, that the user is eligible for the financial service; and
in response to receiving an approval of the financial service from the user through the graphical user interface, activate the financial service for the user by communicating with a service subsystem; and
subsequent to activating the financial service for the user:
receive a network request associated with the user;
determine that the network request has a characteristic; and
based on determining that the network request has the characteristic, forward the network request to the service subsystem, the service subsystem being configured complete the network request using the financial service rather than the deposit account.

2. The system of claim 1, wherein the network request is a first network request, the characteristic is a first characteristic, and the memory further includes program code that is executable by the one or more processors for causing the one or more processors to:
receive a second network request associated with the user;

determine that the second network request has a second characteristic, the second characteristic being different from the first characteristic; and based on determining that the second network request has the second characteristic, forward the second network request to an account subsystem that is configured complete the second network request using the deposit account rather than the financial service, the account subsystem being different from the service subsystem.

3. The system of claim 1, wherein the memory further includes program code that is executable by the one or more processors for causing the one or more processors to:

provide a graphical user interface page through which the user can select which of the deposit account and the financial service is to be used to complete different types of network requests;

receive, through the graphical user interface page, a first user customization indicating that a first type of network request is to be completed using the financial service;

in response to receiving the first user customization, configure the system to complete the first type of network request using the financial service;

receive, through the graphical user interface page, a second user customization indicating that a second type of network request is to be completed using the deposit account, the second type of network request being different from the first type of network request; and in response to receiving the second user customization, configure the system to complete the second type of network request using the deposit account.

4. The system of claim 1, wherein the memory further includes program code that is executable by the one or more processors for causing the one or more processors to, subsequent to determining that the deposit account is eligible for the financial service:

transmit a first notification to a remote computing device associated with the user, the notification indicating that the user is eligible for the financial service;

receive a response to the first notification from the remote computing device, the response indicating approval of the financial service;

based on the response from the remote computing device, activate the financial service for the user; and transmit a second notification to the remote computing device indicating that the financial service is activated.

5. The system of claim 1, wherein the memory further includes program code that is executable by the one or more processors for causing the one or more processors to receive the network request from a third party that is different from the user and an operator of the system.

6. The system of claim 5, wherein the network request corresponds to usage of a card by the user at a physical location associated with the third party.

7. The system of claim 6, wherein the characteristic of the network request is that the network request is associated with the physical location.

8. A method comprising:

establishing, by one or more processors of a computer system associated with a service provider, an online account for a user;

linking, by the one or more processors, the online account to a deposit account of the user with the service provider, the online account being usable to perform account functions related to the deposit account, wherein the account functions include viewing a balance of the deposit account;

determining, by the one or more processors, that the user is eligible for a financial service based on usage data relating to the deposit account of the user, the financial service being provided separately by the service provider from the deposit account;

based on determining that the deposit account is eligible for the financial service:

providing, by the one or more processors and through a graphical user interface when the user is logged into the online account, a notification to the user that the user is eligible for the financial service; and in response to receiving an approval of the financial service from the user through the graphical user interface, activating, by the one or more processors, the financial service for the user by communicating with a service subsystem; and subsequent to activating the financial service for the user:

receiving, by the one or more processors, a network request associated with the user;

determining, by the one or more processors, that the network request has a characteristic; and based on determining that the network request has the characteristic, forwarding, by the one or more processors, the network request to the service subsystem, the service subsystem being configured complete the network request using the financial service rather than the deposit account.

9. The method of claim 8, wherein the network request is a first network request, the characteristic is a first characteristic, and further comprising:

receiving a second network request associated with the user;

determining that the second network request has a second characteristic, the second characteristic being different from the first characteristic; and based on determining that the second network request has the second characteristic, forwarding the second network request to an account subsystem that is configured complete the second network request using the deposit account rather than the financial service, the account subsystem being different from the service subsystem.

10. The method of claim 8, further comprising:

providing a graphical user interface page through which the user can select which of the deposit account and the financial service is to be used to complete different types of network requests;

receiving, through the graphical user interface, a first user customization indicating that a first type of network request is to be completed using the financial service;

in response to receiving the first user customization, configuring the computer system to complete the first type of network request using the financial service;

receiving, through the graphical user interface page, a second user customization indicating that a second type of network request is to be completed using the deposit account, the second type of network request being different from the first type of network request; and in response to receiving the second user customization, configuring the computer system to complete the second type of network request using the deposit account.

11. The method of claim 8, further comprising, subsequent to determining that the deposit account is eligible for the financial service:

transmitting a first notification to a remote computing device associated with the user, the notification indicating that the user is eligible for the financial service;

receiving a response to the first notification from the remote computing device, the response indicating approval of the financial service;

based on the response from the remote computing device, activating the financial service for the user; and transmitting a second notification to the remote computing device indicating that the financial service is activated.

12. The method of claim 8, further comprising receiving the network request from a third party that is different from the user and an operator of the computer system, the operator being the service provider.

13. The method of claim 12, wherein the network request corresponds to usage of a card by the user at a physical location associated with the third party.

14. The method of claim 13, wherein the characteristic of the network request is that the network request is associated with the physical location.

15. A non-transitory computer-readable medium comprising program code that is executable by one or more processors of a computer system associated with a service provider for causing the one or more processors to:

establish an online account for a user;

link the online account to a deposit account of the user with the service provider, the online account being usable to perform account functions related to the deposit account, wherein the account functions include viewing a balance of the deposit account;

determine that the user is eligible for a financial service based on usage data relating to the deposit account of the user, the financial service being provided separately by the service provider from the deposit account;

based on determining that the deposit account is eligible for the financial service:

provide a notification to the user, through a graphical user interface when the user is logged into the online account, that the user is eligible for the financial service; and in response to receiving an approval of the financial service from the user through the graphical user interface, activate the financial service for the user by communicating with a service subsystem; and subsequent to activating the financial service for the user:

receive a network request associated with the user;

determine that the network request has a characteristic; and based on determining that the network request has the characteristic, forward the network request to the service subsystem, the service subsystem being configured complete the network request using the financial service rather than the deposit account.

16. The non-transitory computer-readable medium of claim 15, wherein the network request is a first network request, the characteristic is a first characteristic, and further comprising program code that is executable by the one or more processors for causing the one or more processors to:

receive a second network request associated with the user;

determine that the second network request has a second characteristic, the second characteristic being different from the first characteristic; and based on determining that the second network request has the second characteristic, forward the second network request to an account subsystem that is configured complete the second network request using the deposit account rather than the financial service, the account subsystem being different from the service subsystem.

17. The non-transitory computer-readable medium of claim 15, further comprising program code that is executable by the one or more processors for causing the one or more processors to:

provide a graphical user interface page through which the user can select which of the deposit account and the financial service is to be used to complete different types of network requests;

receive, through the graphical user interface page, a first user customization indicating that a first type of network request is to be completed using the financial service;

in response to receiving the first user customization, configure the computer system to complete the first type of network request using the financial service;

receive, through the graphical user interface, a second user customization indicating that a second type of network request is to be completed using the deposit account, the second type of network request being different from the first type of network request; and in response to receiving the second user customization, configure the computer system to complete the second type of network request using the deposit account.

18. The non-transitory computer-readable medium of claim 15, further comprising program code that is executable by the one or more processors for causing the one or more processors to, subsequent to determining that the deposit account is eligible for the financial service:

transmit a first notification to a remote computing device associated with the user, the notification indicating that the user is eligible for the financial service;

receive a response to the first notification from the remote computing device, the response indicating approval of the financial service;

based on the response from the remote computing device, activate the financial service for the user; and transmit a second notification to the remote computing device indicating that the financial service is activated.

19. The non-transitory computer-readable medium of claim 15, further comprising program code that is executable by the one or more processors for causing the one or more processors to receive the network request from a third party that is different from the user and an operator of the computer system, wherein the operator includes the service provider.

20. The non-transitory computer-readable medium of claim 19, wherein the network request corresponds to usage of a card by the user for obtaining an object from the third party.

* * * * *